UNITED STATES PATENT OFFICE.

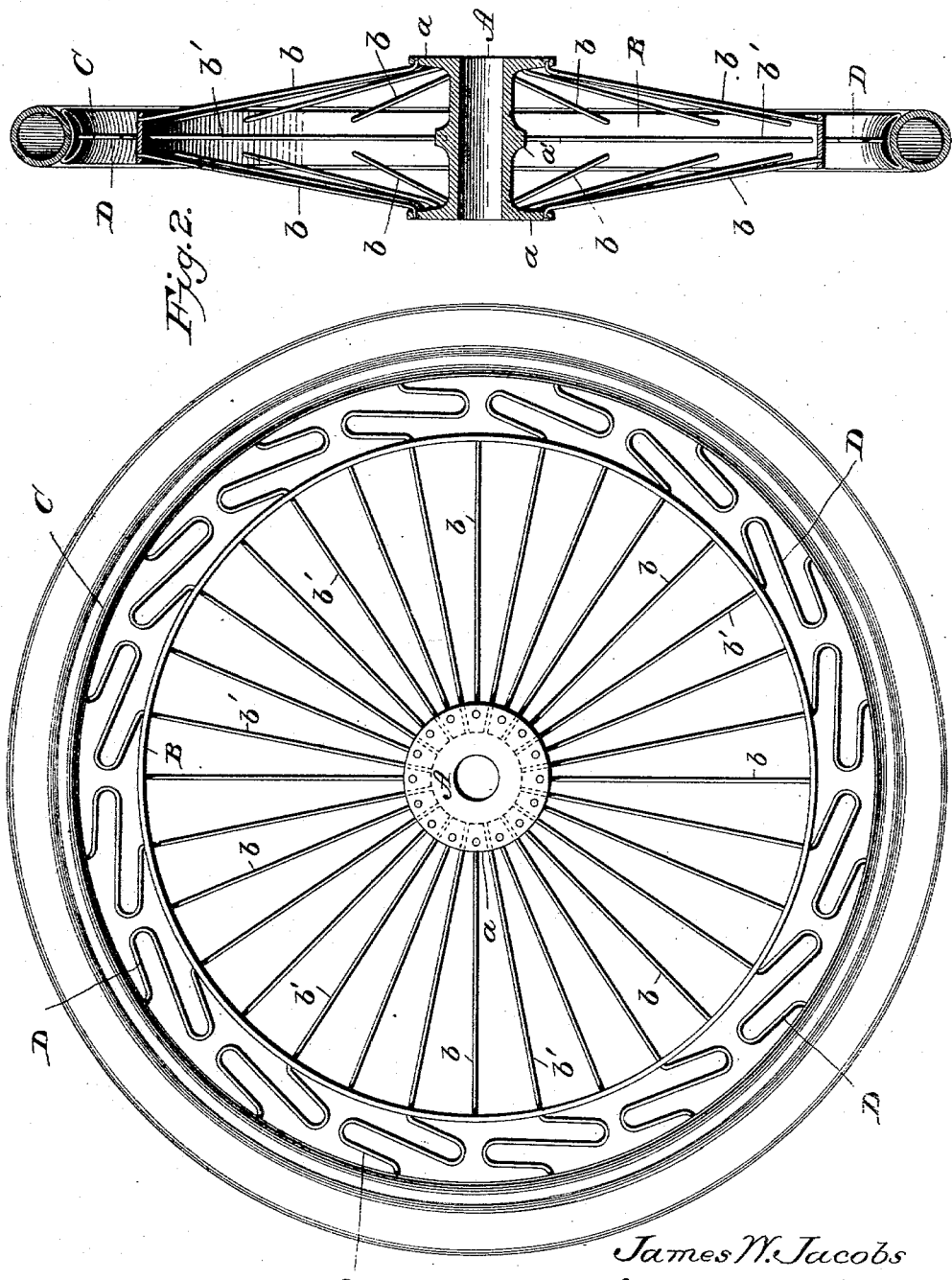

JAMES W. JACOBS, OF JEFFERSONVILLE, INDIANA.

VEHICLE-WHEEL.

SPECIFICATION forming part of Letters Patent No. 561,892, dated June 9, 1896.

Application filed August 30, 1895. Serial No. 561,024. (No model.)

*To all whom it may concern:*

Be it known that I, JAMES W. JACOBS, a citizen of the United States of America, residing at Jeffersonville, in the county of Clark and State of Indiana, have invented certain new and useful Improvements in Vehicle-Wheels; and I do hereby declare the following to be a full, clear, and exact description of the invention, such as will enable others skilled in the art to which it appertains to make and use the same, reference being had to the accompanying drawings, and to letters of reference marked thereon, which form a part of this specification.

The invention is an improvement in wheels for all classes of light vehicles, such as bicycles, velocipedes, carriages, and wagons; and it consists in providing an improved wheel which is made up of a hub having end flanges and a central flange, a flat band or felly attached to the flanges of the hub by a series of spokes, one set of spokes being attached to the outer flanges of the hub and to the outer edges of the felly, while the other set of spokes are attached to the central flange and to the center of the felly, to provide a wheel which is extremely rigid and thoroughly braced, and an outer rim or felly connected to the inner felly by a series of centrally-disposed springs, which will permit the outer rim to give both vertically and laterally, as will be hereinafter fully set forth, and particularly pointed out in the claim.

Heretofore it has been proposed to provide a wheel with an inner felly attached to the usual spokes and an outer felly connected to the inner felly by interposed springs, and my invention is designed as an improvement upon this type of wheel.

In the accompanying drawings, forming part of this specification, Figure 1 is a side elevation of a wheel constructed in accordance with my invention, and Fig. 2 is a vertical sectional view.

A designates the hub, which is provided with end flanges $a\ a$ and a central flange or collar $a'$, preferably of less diameter than the flanges $a$.

B designates a flat inner rim or felly, preferably made up of a band of metal, to the edges of which are attached spokes $b$, which extend from the end flanges $a$ of the hub and are preferably made of wire. To the center of the inner rim or felly B are attached direct spokes $b'$, the inner ends of which are secured to the central flange or collar $a'$ of the hub. It will be seen that so much of the device described presents a wheel which is extremely rigid and is braced against side strains.

C designates the outer rim or felly, which is made up of rigid material and is connected centrally to the rim B by interposed bent springs D, said springs being attached to the rims on a line with the direct spokes $b'$ and lie entirely within the rims. The springs are bent in the shape shown, so as to form double loops, and said loops in practice extend to a point nearly on a line with the spokes $b$.

The spokes and number of springs which are used depend upon the use to which the wheel is to be put. When the wheel is adapted to be used for bicycles, the outer rim is constructed to receive a rubber or pneumatic tire.

Having thus described my invention, what I claim as new, and desire to secure by Letters Patent, is—

In a wheel, the combination with a hub having end flanges $a\ a$ and a central collar or flange $a'$, of a rim or felly B made up of a flat band and connected to the hub by rigid spokes $b$ and $b'$, the spokes $b$ extending from the outer flanges of the hub to the outer edges of the felly and the spokes $b'$ from the center of the felly to the center flange of the hub; together with an outer rim or felly and tire therefor, the inner and outer fellies being connected to each other by a centrally-disposed series of springs which are attached to the fellies on a line with the central spokes $b'$, the bent portions of the springs extending in opposite directions, substantially as shown, whereby the outer felly is permitted to have a vertical and lateral movement independent of the inner felly.

In testimony whereof I affix my signature in presence of two witnesses.

JAMES W. JACOBS.

Witnesses:
EDGAR A. HOWARD,
JOHN H. LEWMAN.